United States Patent
Tsuru et al.

(10) Patent No.: US 12,080,484 B2
(45) Date of Patent: *Sep. 3, 2024

(54) MULTILAYER CERAMIC CAPACITOR

(71) Applicant: Murata Manufacturing Co., Ltd., Nagaokakyo (JP)

(72) Inventors: Akihiro Tsuru, Nagaokakyo (JP); Kazuhisa Uchida, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 283 days.

This patent is subject to a terminal disclaimer.

(21) Appl. No.: 17/498,872

(22) Filed: Oct. 12, 2021

(65) Prior Publication Data
US 2022/0028620 A1 Jan. 27, 2022

Related U.S. Application Data

(63) Continuation of application No. 16/818,261, filed on Mar. 13, 2020, now Pat. No. 11,264,174.

(30) Foreign Application Priority Data

Mar. 19, 2019 (JP) ................. 2019-051073

(51) Int. Cl.
| | |
|---|---|
| C04B 35/468 | (2006.01) |
| H01G 2/02 | (2006.01) |
| H01G 4/012 | (2006.01) |
| H01G 4/12 | (2006.01) |
| H01G 4/30 | (2006.01) |

(52) U.S. Cl.
CPC ........... *H01G 4/30* (2013.01); *C04B 35/4682* (2013.01); *H01G 2/02* (2013.01); *H01G 4/012* (2013.01); *H01G 4/1227* (2013.01)

(58) Field of Classification Search
CPC ............ B32B 18/00; C04B 2235/3206; C04B 2235/3208; C04B 2235/3217;
(Continued)

(56) References Cited

U.S. PATENT DOCUMENTS

| | | |
|---|---|---|
| 2003/0031871 A1 | 2/2003 | Hattori et al. |
| 2005/0260410 A1 | 11/2005 | Fujikawa et al. |
| | (Continued) | |

FOREIGN PATENT DOCUMENTS

| | | |
|---|---|---|
| JP | 2003002748 A | 1/2003 |
| JP | 2004107200 A | 4/2004 |
| | (Continued) | |

OTHER PUBLICATIONS

Korean Office Action issued for KR Application No. 10-2020-0026332, date of Office Action Jun. 17, 2021.
(Continued)

*Primary Examiner* — Timothy J Thompson
*Assistant Examiner* — Guillermo J Egoavil
(74) *Attorney, Agent, or Firm* — ArentFox Schiff LLP

(57) ABSTRACT

A multilayer ceramic capacitor that includes a ceramic body including a stack of a plurality of dielectric layers and a plurality of first and second internal electrodes; and first and second external electrodes provided at each of both end faces of the ceramic body. Each of the plurality of dielectric layers contain Ba, Ti, P and Si. The plurality of dielectric layers include an outer dielectric layer located on an outermost side in the stacking direction; an inner dielectric layer located between the first and second internal electrodes; and a side margin portion in a region where the first and second internal electrodes do not exist. In at least one of the outer dielectric layer, the inner dielectric layer and the side margin portion, the P and the Si segregate in at least one of grain-boundary triple points of three ceramic particles.

12 Claims, 3 Drawing Sheets

(58) Field of Classification Search
CPC .... C04B 2235/3224; C04B 2235/3227; C04B 2235/3229; C04B 2235/3232; C04B 2235/3239; C04B 2235/3241; C04B 2235/3244; C04B 2235/3256; C04B 2235/3258; C04B 2235/3262; C04B 2235/3272; C04B 2235/3275; C04B 2235/3281; C04B 2235/3418; C04B 2235/447; C04B 2235/5445; C04B 2235/79; C04B 2235/85; C04B 2235/9615; C04B 2237/345; C04B 2237/704; C04B 35/4682; C04B 35/62685; C04B 35/62805; C04B 35/62807; C04B 35/6325; C04B 35/468; H01G 2/02; H01G 4/012; H01G 4/1209; H01G 4/1227; H01G 4/224; H01G 4/30; H01G 4/12
USPC ......... 361/321.4, 301.4, 306.3, 321.2, 321.5; 174/260
See application file for complete search history.

(56) References Cited

U.S. PATENT DOCUMENTS

| | | | |
|---|---|---|---|
| 2006/0116273 | A1 | 6/2006 | Ito et al. |
| 2016/0155570 | A1* | 6/2016 | Shimada ................ B32B 18/00 29/25.42 |
| 2018/0040424 | A1* | 2/2018 | Takahashi ............... C04B 35/64 |
| 2020/0161048 | A1* | 5/2020 | Chun ..................... H01G 4/012 |
| 2020/0258689 | A1* | 8/2020 | Kato ........................ H01G 4/30 |
| 2021/0179494 | A1 | 6/2021 | Iguchi |
| 2021/0183573 | A1 | 6/2021 | Iguchi |

FOREIGN PATENT DOCUMENTS

| | | |
|---|---|---|
| JP | 2013126936 A | 6/2013 |
| KR | 1020060061245 A | 6/2006 |
| KR | 100656298 B1 | 12/2006 |

OTHER PUBLICATIONS

Chinese Office Action issued for Chinese Application No. 202010184175.8, issuing date Aug. 24, 2021.

Xiaohui, W. et al.; "Research on Sintering Process and Dielectric Properties of Phosphorus-doped Barium Titanate Ceramic"; Functional Materials, vol. 29, Iss. 6, Jun. 1998, published Dec. 31, 1998, pp. 613-615. (translation of abstract only).

Caballero, A.C., et al.; "Phosphor-doped BaTiO3: microstructure development and dielectric properties"; Journal of Materials Science, 30, Aug. 1995, pp. 3799-3804.

* cited by examiner

MULTILAYER CERAMIC CAPACITOR

CROSS REFERENCE TO RELATED APPLICATIONS

The present application is a continuation of application Ser. No. 16/818,261, filed Mar. 13, 2020, which claims priority to Japanese Patent Application No. 2019-051073, filed Mar. 19, 2019, the entire contents of each of which are incorporated herein by reference.

BACKGROUND OF THE INVENTION

The present invention relates to a multilayer ceramic capacitor.

Multilayer ceramic capacitors have been increased in capacity and reduced in size, and accordingly, dielectric layers have also been reduced in thickness.

In the process of manufacturing a multilayer ceramic capacitor having a thin dielectric layer, when grain growth of metal particles forming an internal electrode occurs during firing, the thickness of the dielectric layer is further reduced at the position where this grain growth occurs. Thereby, the ratio of covering the internal electrode by the dielectric layer decreases.

Thus, the process of manufacturing a multilayer ceramic capacitor requires firing at a temperature sufficiently low enough to prevent grain growth of the metal particles forming the internal electrode.

As a method for firing at a low temperature, Japanese Patent Laying-Open No. 2013-126936 discloses a method of firing a mixture of: raw materials of a main component represented by the general formula $ABO_3$ (where A is at least one type of element selected from Ba, Ca and Sr; and B is at least one type of element selected from Ti and Zr) and an Li compound added thereto.

However, when the raw material mixed with an Li compound is fired, Li may volatilize, thereby preventing low-temperature firing.

SUMMARY OF THE INVENTION

A main object of the present invention is to provide a multilayer ceramic capacitor for which low-temperature firing can be implemented.

A multilayer ceramic capacitor of the present invention includes a ceramic body including a stack of a plurality of dielectric layers and a plurality of first and second internal electrodes, the ceramic body having a first main surface and a second main surface that face each other in a stacking direction, a first side surface and a second side surface that face each other in a width direction orthogonal to the stacking direction, and a first end face and a second end face that face each other in a length direction orthogonal to the stacking direction and the width direction; and first and second external electrodes electrically connected, respectively, to the first and second internal electrodes at each of the first end face and the second end face of the ceramic body.

Each of the dielectric layers contain Ba, Ti, P and Si.

The plurality of dielectric layers include an outer dielectric layer located on an outermost side of the ceramic body in the stacking direction; an inner dielectric layer located between the first and second internal electrodes adjacent to each other in the stacking direction; and a side margin portion in a region where the internal electrodes do not exist when the ceramic body is viewed in the stacking direction.

In at least one of the outer dielectric layer, the inner dielectric layer and the side margin portion, the P and the Si segregate in at least one of grain-boundary triple points of three ceramic particles of the ceramic particles as seen in a plane defined in the stacking direction and the width direction at a central position in the length direction.

A content of the P may be 0.005 part by mole to 0.20 part by mole with respect to 100 parts by mole of Ti.

A content of the P may be 1 part by mole to 10 parts by mole with respect to 100 parts by mole of Si.

Each of the dielectric layers preferably further includes R that is at least one type selected from La, Ce, Pr, Nd, Sm, Eu, Gd, Tb, Dy, Ho, Er, Tm, Yb, Lu, and Y.

A content of the R may be 0.3 part by mole to 5.0 parts by mole with respect to 100 parts by mole of Ti.

A content of the R may preferably be 0.5 part by mole to 2.5 parts by mole with respect to 100 parts by mole of Ti.

Each of the dielectric layers preferably further includes M that is at least one type selected from Mg, Zr, Mn, Co, Fe, Cr, Cu, Al, V, Mo, and W.

A content of the M may be 0.3 part by mole to 4.0 parts by mole with respect to 100 parts by mole of Ti.

A content of the M may preferably be 0.5 part by mole to 2.0 parts by mole with respect to 100 parts by mole of Ti.

In each of the outer dielectric layer, the inner dielectric layer and the side margin portion of the dielectric layers, the P and the Si may segregate in at least one of the grain-boundary triple points.

A source of the P may be phosphate ester.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

The embodiments of the present invention will be hereinafter described with reference to the accompanying drawings.

Figure 1:
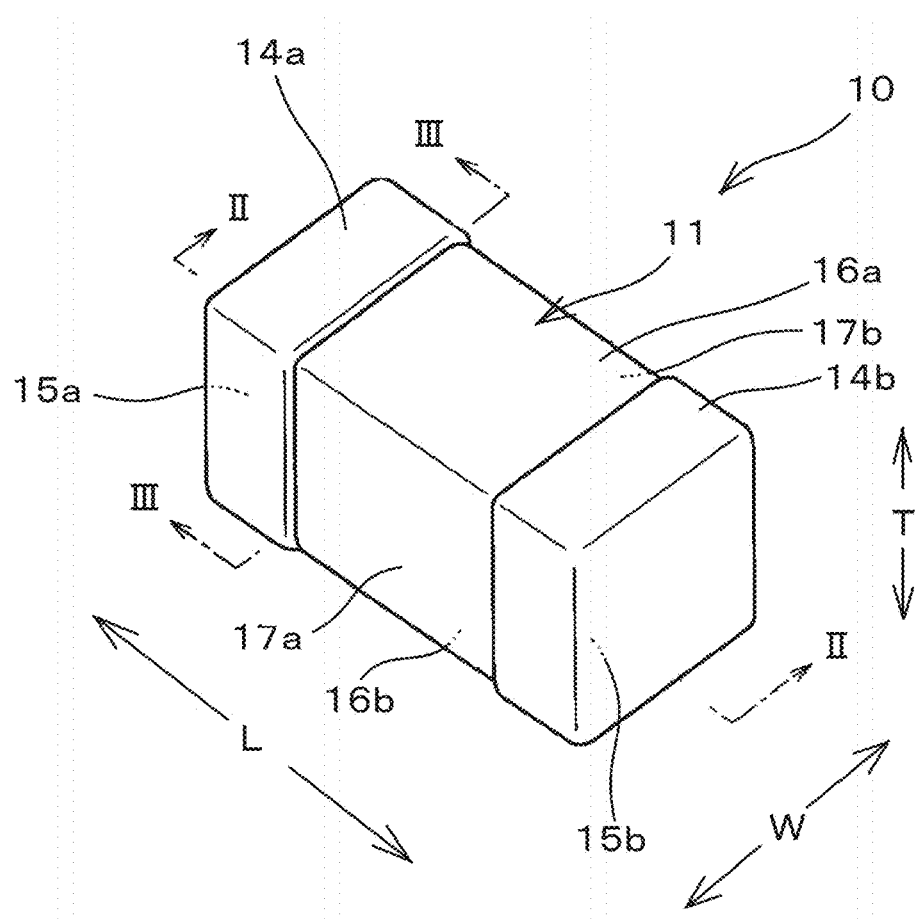
FIG. 1 is a perspective view of a multilayer ceramic capacitor in one embodiment.

FIG. 1 is a perspective view of a multilayer ceramic capacitor 10 in one embodiment.

Figure 2:
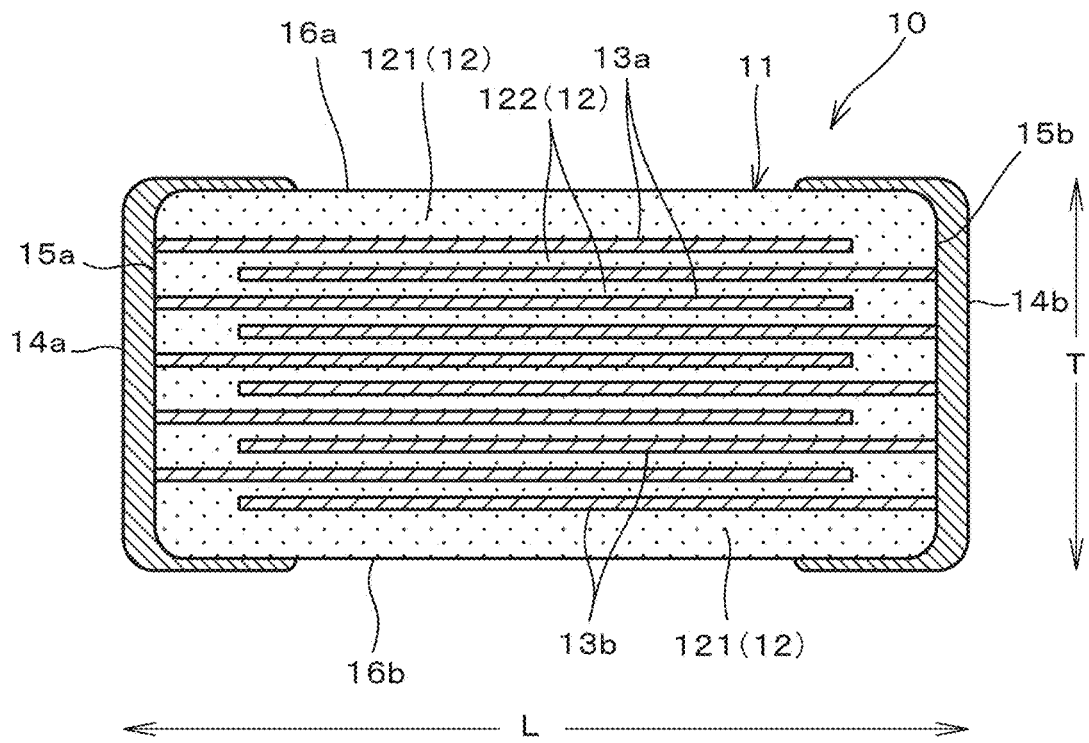
FIG. 2 is a cross-sectional view of the multilayer ceramic capacitor shown in FIG. 1 taken along a line II-II.
Figure 3:
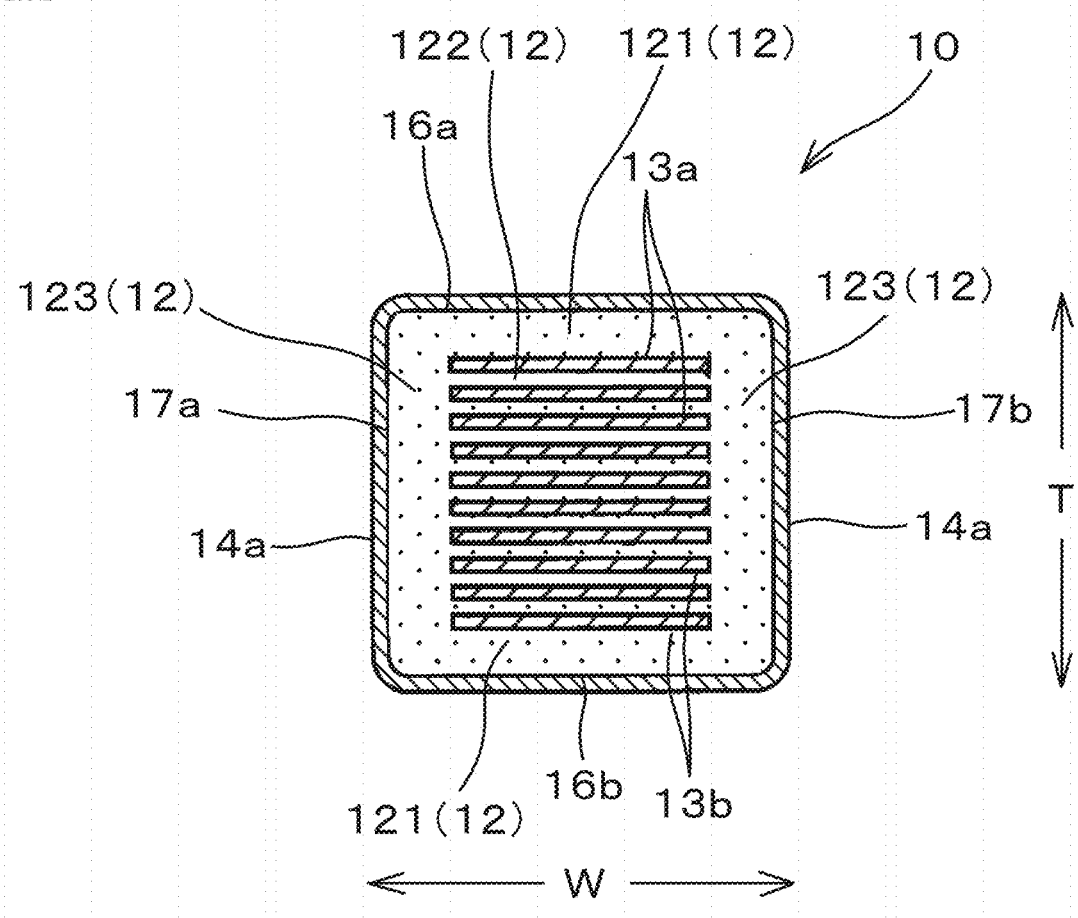
FIG. 3 is a cross-sectional view of the multilayer ceramic capacitor shown in FIG. 1 taken along a line III-III.

FIG. 2 is a cross-sectional view of multilayer ceramic capacitor 10 shown in FIG. 1 taken along a line II-II. FIG. 3 is a cross-sectional view of multilayer ceramic capacitor 10 shown in FIG. 1 taken along a line III-III.

As shown in FIGS. 1 to 3, the multilayer ceramic capacitor 10 is an electronic component having a rectangular parallelepiped shape, and which includes a ceramic body 11 and a pair of external electrodes 14a and 14b. The pair of external electrodes 14a and 14b are disposed to face each other as shown in FIG. 1.

In this case, the direction in which the pair of external electrodes 14a and 14b face each other is defined as a length direction L of multilayer ceramic capacitor 10. The direction in which dielectric layers 12 and internal electrodes 13a and 13b (described later) are stacked on one another is defined as a stacking direction T. The direction orthogonal to each of length direction L and stacking direction T is defined as a width direction W.

Ceramic body 11 has a first end face 15a and a second end face 15b that face each other in length direction L; a first main surface 16a and a second main surface 16b that face each other in stacking direction T; and a first side surface 17a and a second side surface 17b that face each other in width direction W.

First end face 15a is provided with first external electrode 14a while second end face 15b is provided with second external electrode 14b.

Ceramic body 11 has a corner portion and a ridgeline portion, each of which is preferably rounded. In this case, the corner portion is configured as a portion at which three planes of ceramic body 11 cross each other. The ridgeline portion is configured as a portion at which two planes of ceramic body 11 cross each other.

Ceramic body 11 preferably has a dimension of 0.15 mm to 3.3 mm in length direction L, for example; a dimension of 0.1 mm to 2.7 mm in width direction W, for example; and a dimension of 0.1 mm to 2.7 mm in stacking direction T, for example. It is to be noted that the dimensions of ceramic body 11 are not limited to the above-mentioned numerical values. The dimensions of ceramic body 11 can be measured by a micrometer or an optical microscope.

As shown in FIGS. 2 and 3, ceramic body 11 includes a stack of a plurality of dielectric layers 12; and a plurality of first internal electrodes 13a and second internal electrodes 13b. More specifically, ceramic body 11 has a structure formed by first internal electrodes 13a and second internal electrodes 13b that are alternately stacked on one another in stacking direction T such that a dielectric layer 12 is interposed between each first internal electrode 13a and each second internal electrode 13b.

As shown in FIG. 3, the dielectric layers 12 include outer dielectric layers 121 located outside internal electrodes 13a and 13b in stacking direction T and that are located on the outermost sides in stacking direction T; inner dielectric layers 122 located between two internal electrodes 13a and 13b adjacent to each other in stacking direction T; and a side margin portion 123 as a region where internal electrodes 13a and 13b do not exist in a view of ceramic body 11 as seen in stacking direction T.

More specifically, outer dielectric layers 121 are located between internal electrodes 13a and 13b located on the outermost side in stacking direction T; and respective first main surface 16a and second main surface 16b of ceramic body 11. Also, inner dielectric layers 122 are located between first internal electrode 13a and second internal electrode 13b adjacent to each other in stacking direction T. Side margin portion 123 is located outside outer dielectric layer 121 and inner dielectric layer 122 in width direction W.

The thickness of outer dielectric layers 121 is preferably 5 μm to 100 μm, for example. The thickness of inner dielectric layers 122 is preferably 0.3 μm to 2.5 μm, and more preferably 0.3 μm to 1.0 μm, for example. Also, the total number of outer dielectric layers 121 and inner dielectric layers 122 is preferably 100 to 2000, and more preferably 200 to 1000, for example.

In the process of manufacturing multilayer ceramic capacitor 10, side margin portion 123 may be formed integrally with inner dielectric layers 122 or may be formed separately from inner dielectric layers 122. When side margin portion 123 is formed separately from inner dielectric layers 122, for example, a plurality of ceramic green sheets each having an internal electrode pattern formed thereon are stacked on one another, and then, a plurality of ceramic green sheets are attached to the outside of the plurality of ceramic green sheets in the width direction, so that side margin portion 123 can be formed. In this case, a physical boundary exists between side margin portion 123 and the multilayer body including outer dielectric layers 121, internal electrodes 13a, 13b, and inner dielectric layers 122.

Dielectric layers 12 include a plurality of ceramic particles each containing Ba and Ti. This ceramic particle is, for example, a crystal particle of a perovskite-type compound represented by the general formula $A_mBO_3$ (where A is Ba and includes at least one type selected from the group consisting of Sr and Ca in addition to Ba; B is Ti and includes at least one type selected from the group consisting of Zr and Hf in addition to Ti; O is oxygen; and m indicates a molar ratio of A and B).

Dielectric layers 12 contain subcomponents R, M, and P in addition to the perovskite-type compound contained as a main component.

R is at least one type selected from the group consisting of La, Ce, Pr, Nd, Sm, Eu, Gd, Tb, Dy, Ho, Er, Tm, Yb, Lu, and Y, each of which is a rare earth element. The content of R is, for example, 0.3 part by mole to 5.0 parts by mole with respect to 100 parts by mole of Ti, and preferably 0.5 part by mole to 2.5 parts by mole with respect to 100 parts by mole of Ti. When R includes a plurality of types of elements, the content of R means the total content of the plurality of types of elements.

M is at least one type selected from the group consisting of Mg, Zr, Mn, Co, Fe, Cr, Cu, Al, V, Mo, and W. The content of M is 0.3 part by mole to 4.0 parts by mole with respect to 100 parts by mole of Ti, and preferably 0.5 part by mole to 2.0 parts by mole with respect to 100 parts by mole of Ti. When M includes a plurality of types of elements, the content of M means the total content of the plurality of types of elements.

The forms of subcomponents R and M existing in dielectric layers 12 is not particularly limited, but may exist inside the crystal particle of the perovskite-type compound, for example. Specifically, subcomponents R and M may be dissolved in the crystal particle of the perovskite-type compound so as to form a structure such that the core and the shell cannot be clearly distinguished from each other.

More specifically, it is preferable that a ceramic particle is formed of a core portion made of a perovskite-type compound containing Ba and Ti; and a shell portion formed by R and M dissolved around the core portion. Further, it is more preferable that a ceramic particle is formed of a core portion made of barium titanate not containing at least Ca; and a shell portion formed by Ca, Mg, R and M dissolved around the core portion. Furthermore, it is particularly preferable that the core portion is $Ba_mTiO_3$ ($0.99 \leq m \leq 1.02$) not containing Ca, R, M, and Si.

In the manufacturing process, Zr may be contained in the central portion of the crystalline particle of the perovskite-type compound. In this case, the content of Zr is preferably equal to or less than 0.02 part by mole with respect to 100 parts by mole of Ti.

In multilayer ceramic capacitor 10 in the present embodiment, in at least one of outer dielectric layers 121, inner dielectric layers 122 and side margin portions 123, P and Si segregate in at least one of the grain-boundary triple points of three ceramic particles as seen in a plane defined in stacking direction T and width direction W at a central position in length direction L. In this case, P and Si may segregate not only in the grain-boundary triple points but also in the grain boundary of the ceramic particles and at the positions corresponding to the grain boundary multiple points of four or more ceramic particles. Furthermore, the subcomponents may exist in the crystal grain boundary or in the grain-boundary triple points in the form of an oxide and the like. It should be noted that the plane defined in stacking direction T and width direction W is a plane orthogonal to length direction L.

Particularly, in each of outer dielectric layers 121, inner dielectric layers 122, and side margin portions 123, P and Si preferably segregate in at least one of the grain-boundary triple points as seen in the plane defined in stacking direction T and width direction W at the central position in length direction L.

The content of P in dielectric layers 12 is 0.005 part by mole to 0.20 part by mole with respect to 100 parts by mole of Ti. Furthermore, the content of P is 1 part by mole to 10 parts by mole with respect to 100 parts by mole of Si.

The contents of R, M, and P described above can be obtained as described below. Specifically, first external electrode 14a and second external electrode 14b of multilayer ceramic capacitor 10 are removed by polishing. Then, the obtained ceramic body 11 is dissolved by a solvent and subjected to the ICP analysis, thereby obtaining the contents of R, M, and P. The dissolving process can be performed by an alkali fusion method, for example.

Figure 4:
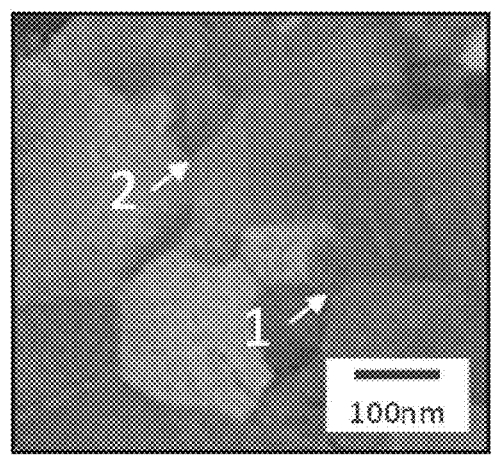
FIG. 4 shows a bright field image of a dielectric layer taken by a TEM (transmission electron microscope), in which portions observed by TEM-EDX (energy dispersive x-ray spectrometry) are indicated by arrows.
Figure 5A:
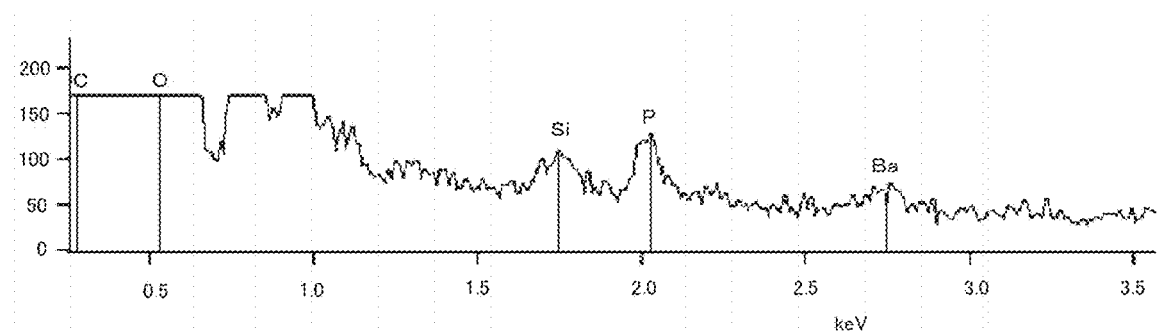
FIG. 5A shows a TEM-EDX spectrum of a portion "1" indicated by an arrow in FIG. 4.
Figure 5B:
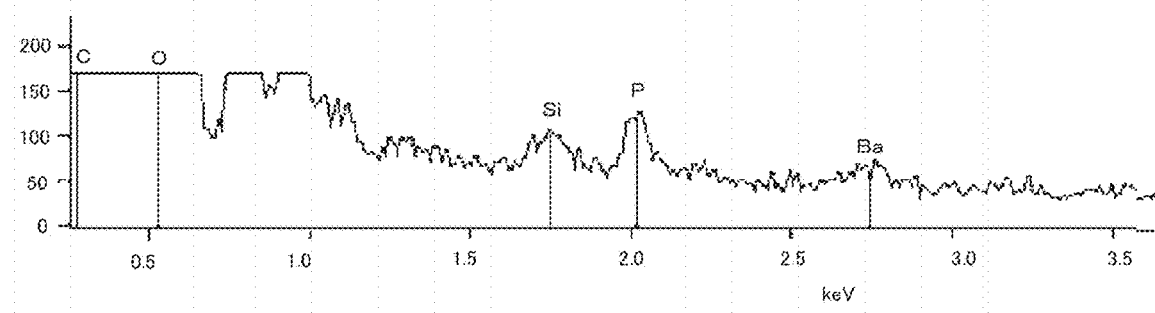
FIG. 5B shows a TEM-EDX spectrum of a portion "2" indicated by an arrow in FIG. 4.

FIG. 4 shows a TEM bright field image of dielectric layer 12. The plane observed in this case is defined in stacking direction T and width direction W at the central position of multilayer ceramic capacitor 10 in length direction L. In FIG. 4, two points "1" and "2" indicated by arrows are grain-boundary triple points of three ceramic particles, where P and Si coexist, which is observed in the TEM-EDX spectra shown in FIGS. 5A and 5B. FIG. 5A shows a TEM-EDX spectrum of the portion "1" indicated by an arrow in FIG. 4. FIG. 5B shows a TEM-EDX spectrum of the portion "2" indicated by an arrow in FIG. 4.

In the multilayer ceramic capacitor 10 of the present embodiment, in at least one of outer dielectric layers 121, inner dielectric layers 122 and side margin portions 123 of dielectric layers 12, P and Si segregate in at least one of the grain-boundary triple points as seen in the plane defined in stacking direction T and width direction W at the central position in length direction L, thereby allowing low-temperature sintering during firing. This is presumed as a situation that P and Si segregate in the grain-boundary triple points, so that low-melting point and low-viscosity glass made of P and Si as a main frame is formed and then sintered at a low temperature. Also, it is presumed that P and Si segregate in the grain-boundary triple points after densification, so that a high dielectric constant can be maintained. By low-temperature sintering in the process of manufacturing a multilayer ceramic capacitor, a large-capacity and thinner multilayer ceramic capacitor can be obtained.

The following is a further detailed explanation about the above-mentioned low-temperature sintering. The glass to be liquid-phase sintered for the multilayer ceramic capacitor is generally made of an Si-based oxide. It is generally considered that Si can be combined with four pieces of bridging oxygen at the maximum when forming a glass frame. Due to such a network structure, however, low-temperature sintering becomes difficult. On the other hand, it is generally considered that P can be combined with only three pieces of bridging oxygen at the maximum when forming a glass frame. Thus, a P—Si based oxide including Si and P contains less bridging oxygen combined with P in the glass frame, and therefore, allows flexibility in the frame and is effective for low-temperature sintering. Furthermore, P is less likely to volatilize in a firing atmosphere for the multilayer ceramic capacitor.

For example, by the energy analysis method using a scanning transmission electron microscope including a Schottky-type FE electron gun, it can be checked whether P and Si segregate in the grain-boundary triple points or not. By this analysis, a TEM image, a so-called mapping image and an EDX spectrum for point analysis can be obtained. In order to accurately detect the distribution state of a small amount of additional elements, it is preferable to perform a point analysis for 60 seconds of the observation time using an electron probe having a diameter of about 1 nm.

First internal electrodes 13a extend to first end face 15a of ceramic body 11. Second internal electrodes 13b extend to second end face 15b of ceramic body 11.

In addition to first internal electrodes 13a and second internal electrodes 13b, ceramic body 11 may include an internal electrode not exposed to its surface.

First internal electrodes 13a include a counter electrode portion that faces an adjacent second internal electrode 13b; and an extending electrode portion that extends from the counter electrode portion to first end face 15a of ceramic body 11. Also, second internal electrodes 13b include a counter electrode portion that faces an adjacent first internal electrode 13a; and an extending electrode portion that extends from the counter electrode portion to second end face 15b of ceramic body 11.

The counter electrode portion of first internal electrode 13a and the counter electrode portion of second internal electrode 13b face each other with dielectric layer 12 interposed therebetween, thereby forming a capacity so as to function as a capacitor.

First internal electrode 13a and second internal electrode 13b each contain metal such as Ni, Cu, Ag, Pd, and Au, or an alloy of Ag and Pd, for example. First internal electrode 13a and second internal electrode 13b may also contain dielectric particles each having the same composition as that of ceramic contained in dielectric layer 12.

The thickness of each of first internal electrodes 13a and second internal electrodes 13b is, for example, 0.2 μm to 0.8 μm, and preferably 0.2 μm to 0.5 μm. The number of stacked internal electrodes including first internal electrodes 13a and second internal electrodes 13b is 100 to 2000, for example.

The ratio of covering inner dielectric layers 122 to internal electrodes 13a and 13b is for example 75% to 95%, and preferably 80% to 90%.

In this case, the thickness of each of dielectric layers 12, first internal electrodes 13a and second internal electrodes 13b can be measured by the following method.

First, the plane of ceramic body 11 defined in stacking direction T and width direction W (that is, the plane of ceramic body 11 that is orthogonal to length direction L) is polished to expose a cross section, which is then observed with a scanning electron microscope. Then, the thickness of dielectric layer 12 is measured along a total of five lines including: a center line passing through the center of the exposed cross section along stacking direction T; and two lines extending in parallel with the center line at regular intervals from this center line toward one side; and two lines extending in parallel with the center line at regular intervals from this center line toward the other side. The average value of five measured values is defined as a thickness of dielectric layer 12.

For more accuracy, the above-mentioned five measured values are obtained in each of an upper portion, a central portion, and a lower portion that are obtained by virtually dividing ceramic body 11 in stacking direction T. Then, all of these measured values are averaged to obtain an average value that is defined as a thickness of dielectric layer 12.

The method of measuring the thickness of dielectric layer 12 has been described above. Also, by the method conforming to this method of measuring the thickness of dielectric layer 12, the thickness of each of first internal electrode 13a and second internal electrode 13b can be measured using a scanning electron microscope along the same cross section as that along which the thickness of dielectric layer 12 is measured.

First external electrode 14a is formed to extend entirely over first end face 15a of ceramic body 11 and extend from first end face 15a partially over first main surface 16a, second main surface 16b, first side surface 17a, and second side surface 17b. First external electrode 14a is electrically connected to first internal electrode 13a.

Second external electrode 14b is formed to extend entirely over second end face 15b of ceramic body 11 and extend from second end face 15b partially over first main surface 16a, second main surface 16b, first side surface 17a, and second side surface 17b. Second external electrode 14b is electrically connected to second internal electrode 13b.

First external electrode 14a and second external electrode 14b each include an underlying electrode layer and a plated layer that is disposed on the underlying electrode layer, for example.

The underlying electrode layer includes at least one layer among layers such as a baked electrode layer, a resin electrode layer, and a thin electrode layer, as will be described below.

The baked electrode layer contains glass and metal. The number of baked electrode layers may be one or may be more than one. The thickest portion of the baked electrode layer has a thickness of 5 μm to 100 μm, for example. The baked electrode layer contains metal such as Cu, Ni, Ag, Pd, and Au, or an alloy of Ag and Pd, for example.

The baked electrode layer is formed by baking a multi-layer body to which an electrically conductive paste containing glass and metal has been applied. Baking may be performed simultaneously with firing of the ceramic body, or may be performed after firing of the ceramic body.

The resin electrode layer can be formed as a layer containing electrically conductive particles and a thermo-setting resin, for example. When the resin electrode layer is formed, the resin electrode layer may be formed directly on the ceramic body without forming a baked electrode layer. The number of resin electrode layers may be one or may be more than one. The thickest portion of the resin electrode layer has a thickness of 5 μm to 100 μm, for example.

The thin electrode layer is a layer formed by deposition of metal particle and having a thickness of 1 μm or less, for example. The thin electrode layer can be formed by known thin-film forming methods such as a sputtering method or an evaporation method.

The plated layer disposed on the underlying electrode layer contains at least one of: metal such as Cu, Ni, Ag, Pd, and Au; and an alloy of Ag and Pd, for example. The number of plated layers may be one or may be more than one. It is preferable that the plated layer has a two-layer structure including a Ni-plated layer and an Sn-plated layer. The Ni-plated layer functions to prevent the underlying electrode layer from being eroded by the solder used for mounting multilayer ceramic capacitor 10. The Sn-plated layer functions to improve the wettability of the solder used for mounting multilayer ceramic capacitor 10. The thickness of each of the plated layers is 1 μm or more and 10 μm or less, for example.

Also, first external electrode 14a and second external electrode 14b do not have to include the above-mentioned underlying electrode layer, but may be formed of a plated layer that is to be directly disposed on ceramic body 11. In this case, the plated layer is directly connected to first internal electrode 13a or second internal electrode 13b.

<Method of Manufacturing Multilayer Ceramic Capacitor>

The following is an explanation about an example of a method of manufacturing multilayer ceramic capacitor 10 described above.

First, a perovskite-type compound containing Ba and Ti is produced. The method of producing a perovskite-type compound is not particularly limited, but may be well-known methods such as a solid-phase method, a hydrothermal synthesis method, and a hydrolysis method.

The molar ratio AB of A and B in the perovskite-type compound represented by the general formula $A_mBO_3$ does not have to have a stoichiometry composition, but is preferably 0.99 to 1.02.

As a source of Ba, a Ba compound such as $BaCO_3$ can be used. As a source of Ti, a Ti compound such as $TiO_2$ can be used.

Then, main component powder containing, as a main component, a perovskite-type compound containing Ba and Ti is mixed with subcomponent powder. Examples of the subcomponent powder to be mixed may be a Ca compound as a source of Ca, an Mg compound as a source of Mg, an R compound as a source of R, an M compound as a source of M, and an Si compound as a source of Si. The Ca compound is $CaCO_3$, for example. The R compound is an oxide of R such as $R_2O_3$, for example. The M compound is an oxide of M, for example. The Si compound is $SiO_2$, for example. These compounds are blended such that the content of R, the content of M, and the content of P with respect to 100 parts by mole of Ti fall within the above-mentioned value ranges in completed multilayer ceramic capacitor 10.

In addition, the form of each type of compound used as a subcomponent is not particularly limited, and not only may be oxide powder and carbonate powder, but also may be chloride powder, sol, an organic metal compound, and the like.

Furthermore, the mixture form of each type of compound used as a subcomponent is not particularly limited. For example, compounds to be a plurality of subcomponents may be mixed in advance, or heat treatment synthesis may be further performed. Also, the compound containing a specific subcomponent may be mixed in two or more steps.

When a YSZ ball is used during mixture of raw materials, Zr from the YSZ ball may be mixed into the raw materials to thereby slightly increase the content of Zr.

Then, phosphate ester as a source of P is added to the powder mixture obtained by the above-mentioned method, thereby obtaining a ceramic material.

Then, an organic binder, a plasticizer, and an organic solvent are added as required to the ceramic material obtained as described above, which are then mixed using a ball mill or the like, to thereby produce ceramic slurry.

In this ceramic slurry, the content of P is 0.005 part by mole to 0.20 part by mole with respect to 100 parts by mole of Ti, and is 1 part by mole to 10 parts by mole with respect to 100 parts by mole of Si. Also, the content of R is 0.3 part by mole to 5.0 parts by mole with respect to 100 parts by mole of Ti, and preferably 0.5 part by mole to 2.5 parts by mole with respect to 100 parts by mole of Ti. Furthermore, the content of M is 0.3 part by mole to 4.0 parts by mole with respect to 100 parts by mole of Ti, and preferably 0.5 part by mole to 2.0 parts by mole with respect to 100 parts by mole of Ti.

Then, ceramic slurry is applied onto a resin film to produce a ceramic green sheet. Then, an electrically conductive paste for internal electrodes is printed on the ceramic green sheet, to thereby form an internal electrode pattern. The electrically conductive paste for internal electrodes may be well-known paste containing an organic binder and an organic solvent. Furthermore, the electrically conductive paste for internal electrodes can be printed by printing methods such as screen printing and gravure printing, for example.

Then, a prescribed number of ceramic green sheets each having no internal electrode pattern formed thereon are stacked, on which a ceramic green sheet having an internal electrode pattern formed thereon is sequentially stacked, on which a prescribed number of ceramic green sheets each having no internal electrode pattern formed thereon are stacked, thereby producing a mother multilayer body.

Then, the mother multilayer body is pressed in the stacking direction by a method such as rigid body pressing, hydrostatic pressing, and the like. Subsequently, the pressed mother multilayer body is cut into prescribed sized pieces by a cutting method such as press cutting, dicing and laser, to thereby obtain a multilayer chip. Then, the corner portion and the ridgeline portion of the multilayer chip may be rounded by barrel polishing and the like.

Then, the multilayer chip is fired to produce a ceramic body. For example, the multilayer chip is heated at a temperature of 350° C. in an $N_2$ atmosphere for three hours to thereby fire the binder, and then fired at a temperature of 1145° C. to 1195° C. for three minutes in a reducing atmosphere containing $H_2$—$N_2$—$H_2O$ gas at an oxygen partial pressure of $10^{-9}$ MPa to $10^{-12}$ MPa.

As a result of the XRD structure analysis of the ceramic body produced by the above-mentioned method, it turned out that the main component of the dielectric layer had a barium titanate-based perovskite structure.

Then, an electrically conductive paste for external electrodes is applied onto both end faces, a part of each of both main surfaces, and a part of each of both side surfaces of the ceramic body. The electrically conductive paste for external electrodes contains, for example, Cu powder, glass frit, an organic solvent, and the like.

Then, the ceramic body having the electrically conductive paste for external electrodes applied thereto is baked. The baking temperature is 700° C. to 900° C., for example. Thereby, a baked electrode layer is formed.

Lastly, a plated layer is formed on the surface of the baked electrode layer as required.

Through the above-mentioned process, a multilayer ceramic capacitor can be manufactured.

In the above-mentioned manufacturing process, the electrically conductive paste for external electrodes is applied onto the fired ceramic body, but the electrically conductive paste for external electrodes may be first applied to the unfired multilayer body, which may then be fired.

EXAMPLE 1

A plurality of types of multilayer ceramic capacitors having dielectric layers containing different amounts of P were produced by firing at different firing temperatures, and the characteristics thereof were examined.

<Production of Ceramic Material>

First, as a starting material of $BaTiO_3$ used as a main component of the dielectric layer, powder of each of highly pure $BaCO_3$ and highly pure $TiO_2$ was prepared and blended such that the molar ratio Ba/Ti of Ba and Ti becomes 1.001.

Then, the blended powder was wet-blended using a ball mill so as to be uniformly diffused and then dried, thereby obtaining preparation powder. Then, the obtained preparation powder was calcined at a temperature of 1000° C. to obtain main component powder with an average grain size of 0.2 μm.

Also, powder of each of $SiO_2$, $MnCO_3$, $MgCO_3$, $Dy_2O_3$, and $ZrO_2$ used as subcomponents of the dielectric layer was prepared.

Then, the prepared powder of each of $SiO_2$, $MnCO_3$, $MgCO_3$, $Dy_2O_3$, and $ZrO_2$ was weighed to respectively contain: 1.5 parts by mole of Si; 0.25 part by mole of Mn; 1.0 part by mole of Mg; 1.0 part by mole of Dy; and 0.10 part by mole of Zr with respect to 100 parts by mole of Ti, and then added to the above-mentioned main component powder, thereby obtaining a powder mixture.

Then, using a ball mill, this powder mixture was wet-blended with dibutyl phosphate weighed such that the content of P becomes equal to the part by mole shown in Table 1. Then, the obtained blended powder mixture was uniformly diffused and then subjected to heating in atmospheric air at 400° C. for one hour and to machine pulverization, thereby obtaining a ceramic material. It should be noted that dibutyl phosphate is phosphate ester as a source of P.

As a result of the ICP analysis of this ceramic material, it was confirmed that this ceramic material had approximately the same preparation composition as those of Si, Mn, Mg, Dy, Zr, and P described above.

In addition, due to intrusion of Zr from the YSZ ball used for mixing, the content of Zr was increased by about 0.01 part by mole.

<Production of Multilayer Ceramic Capacitor>

Then, a polyvinyl butyral-based binder, a plasticizer, and ethanol as an organic solvent were added to the produced ceramic material, which were then wet-blended using a ball mill, to thereby produce ceramic slurry.

Then, the produced ceramic slurry was formed into sheets by a lip-heater method, to thereby obtain a rectangular ceramic green sheet having a thickness of 0.6 μm.

Then, an electrically conductive paste for internal electrodes that contains Ni was screen-printed on the obtained ceramic green sheet to thereby obtain an internal electrode pattern.

Then, a prescribed number of ceramic green sheets each having no internal electrode pattern formed thereon were stacked, on which a plurality of ceramic green sheets each having an internal electrode pattern formed thereon were stacked such that the internal electrode patterns extended alternately toward the opposite sides, on which a prescribed number of ceramic green sheets each having no internal electrode pattern formed thereon were further stacked, to thereby produce a mother multilayer body.

Then, the mother multilayer body was cut in a predetermined size, to thereby obtain a multilayer chip. In this case, the mother multilayer body was cut such that the ceramic body obtained after firing had a dimension of 1.0 mm in length direction L, a dimension of 0.5 mm in width direction W, and a dimension of 0.5 mm in stacking direction T.

The obtained multilayer chip was heated at a temperature of 350° C. in an $N_2$ atmosphere for three hours to fire the binder, and then fired at a temperature of 1145° C. to 1195° C. for three minutes in a reducing atmosphere containing $H_2$—$N_2$—$H_2O$ gas at an oxygen partial pressure of $10^{-9}$ MPa, to thereby obtain a sintered ceramic body.

When this ceramic body was dissolved and subjected to ICP analysis, it was confirmed that the contents of Si, Mn, Mg, Dy, and Zr with respect to 100 parts by mole of Ti (excluding Ni as a component of the internal electrode) were approximately the same as those in the ceramic material.

Also, due to intrusion of Zr from the YSZ ball used for mixing, the content of Zr was increased by about 0.02 part by mole as compared with the preparation composition.

Then, a Cu paste containing glass frit was applied to both end faces, a part of each of both main surfaces and a part of each of both side surfaces of the ceramic body, and then baked at a temperature of 800° C. in an $N_2$ atmosphere, to thereby form a baked electrode layer. Then, plated layers such as an Ni-plated layer and an Sn-plated layer may be formed as required on the surface of the baked electrode layer.

Thus, the multilayer ceramic capacitor was produced by the method as described above. The produced multilayer ceramic capacitor had a dimension of 1.0 mm in length direction L, a dimension of 0.5 mm in width direction W, and a dimension of 0.5 mm in stacking direction T. Furthermore, the thickness of the inner dielectric layer was 0.6 μm, the number of effective dielectric layers was 300, and the area of the counter electrode for each inner dielectric layer was 0.25 mm².

<Evaluation of Characteristics>

For the produced multilayer ceramic capacitor, the shrinkage ratio in length direction L and the dielectric constant were measured.

(1) Shrinkage Ratio in Length Direction L

A dimension L0 of the ceramic body (before a Cu paste was applied thereto) in length direction L was measured. Also, a dimension L1 of the fired ceramic body in the length direction was measured. Dimension L0 of the ceramic body (before a Cu paste was applied thereto) in the length direction was 1.16 mm. Based on these dimensions as reference values, the shrinkage ratio in length direction L was calculated by the following equation (1).

Shrinkage ratio=$(1-(L1/L0))\times 100$    (1)

In this case, five samples were prepared to obtain their shrinkage ratios, which were averaged to obtain an average value.

(2) Measurement of Dielectric Constant

The capacitance of the multilayer ceramic capacitor was measured using an automatic bridge type measurement instrument on the conditions of 25° C., 1 Vrms and 1 kHz, to thereby obtain a dielectric constant from the measured capacitance. In this case, ten samples were prepared, and the dielectric constants thereof were obtained and averaged to obtain an average value.

Table 1 shows the shrinkage ratio in length direction L and the dielectric constant, each of which was obtained by the above-mentioned method. Table 1 shows the shrinkage ratios obtained by firing at different firing temperatures and the dielectric constants for three types of multilayer ceramic capacitors containing P in respective amounts of 0.00 part by mole, 0.05 part by mole, and 0.50 part by mole with respect to 100 parts by mole of Ti.

TABLE 1

| SAMPLE NUMBER | CONTENT OF P WITH RESPECT TO 100 PARTS BY MOLE OF Ti (PART BY MOLE) | SHRINKAGE RATIO AT EACH FIRING TEMPERATURE (%) | | | | | | DIELECTRIC CONSTANT |
|---|---|---|---|---|---|---|---|---|
| | | 1145° C. | 1155° C. | 1165° C. | 1175° C. | 1185° C. | 1195° C. | |
| 1* | 0.00 | 12.9% | 12.9% | 12.9% | 14.4% | 16.2% | 18.0% | 2442 |
| 2 | 0.05 | 13.2% | 13.9% | 14.4% | 18.7% | 19.0% | 19.5% | 3260 |
| 3 | 0.50 | 14.4% | 14.8% | 15.9% | 18.3% | 18.7% | 19.0% | 3051 |

In Table 1, the samples of sample numbers 2 and 3 with no suffix "*" each are a sample satisfying the requirements for the present invention specifying that the dielectric layer 12 includes a plurality of ceramic particles each containing Ba and Ti; and in at least one of outer dielectric layer 121, inner dielectric layer 122 and side margin portion 123 of dielectric layers 12, P and Si segregate in at least one of grain-boundary triple points of three ceramic particles as seen in a plane defined in stacking direction T and width direction W at a central position in length direction L. In other words, when the dielectric layers of the samples of sample numbers 2 and 3 were subjected to point analysis by a TEM-EDX, the following result was observed. Specifically, at each of positions in outer dielectric layer 121, inner dielectric layer 122, and side margin portion 123, P and Si segregated in at least one of the grain-boundary triple points as seen in the plane defined in stacking direction T and width direction W at the central position in length direction L. On the other hand, the sample of sample number 1 with a suffix "*" is a sample not satisfying the above-mentioned requirements for the present invention.

It is presumed that the sample of sample number 1 not satisfying the requirements for the present invention is because it is not sufficiently densified during firing, thereby leading to a relatively low dielectric constant.

On the other hand, the samples of sample numbers 2 and 3 satisfying the requirements for the present invention are greater in shrinkage ratio and dielectric constant than the sample of sample number 1 not satisfying the requirements for the present invention. Thus, low-temperature sintering can be implemented at a temperature of 1200° C. or less. This is presumed as a situation that P and Si segregate in the grain-boundary triple points, so that low-melting point and low-viscosity glass made of P and Si as a main frame is formed and then sintered at a low temperature. Also, it is presumed that P and Si segregate in the grain-boundary triple points after densification, thereby allowing a high dielectric constant to be maintained.

Furthermore, as can be seen from comparison between the sample of sample number 2 and the sample of sample number 3 in Table 1, a larger content of P in the dielectric layer leads to a higher shrinkage ratio at a lower temperature of 1165° C. or less, thereby allowing low-temperature sintering at a lower temperature.

EXAMPLE 2

A plurality of types of multilayer ceramic capacitors having dielectric layers containing different amounts of P and different amounts of Si were produced, and the characteristics thereof were examined.

First, a ceramic material was produced by the same method as that in Example 1. However, when the ceramic material was produced, the prepared powder of each of $SiO_2$, $MnCO_3$, $MgCO_3$, $Dy_2O_3$, and $ZrO_2$ was weighed to respectively contain: 0.25 part by mole of Mn; 1.0 part by mole of Mg; 1.0 part by mole of Dy; and 0.10 part by mole of Zr with respect to 100 parts by mole of Ti, and also to contain Si in an amount shown in Table 2, and then, added to the main component powder to thereby obtain a powder mixture. Then, using a ball mill, the obtained powder mixture was wet-blended with dibutyl phosphate weighed to contain P in an amount shown in Table 2.

Then, a multilayer ceramic capacitor was produced by the same method as that in Example 1. It should be noted that the firing temperature was set at 1185° C. Also, when the ceramic body was dissolved and subjected to ICP analysis, it was confirmed that the contents of Si, Mn, Mg, Dy, Zr, and P with respect to 100 parts by mole of Ti (excluding Ni as a component of the internal electrode) were approximately the same as those in the ceramic material.

<Evaluation of Characteristics>

For the produced multilayer ceramic capacitor, the shrinkage ratio in length direction L and the dielectric constant were measured. The method of measuring the shrinkage ratio in length direction L and the method of measuring the dielectric constant are the same as those in Example 1. Table 2 shows the measurement results.

TABLE 2

| SAMPLE NUMBER | CONTENT OF P WITH RESPECT TO 100 PARTS BY MOLE OF Ti (PART BY MOLE) | CONTENT OF Si WITH RESPECT TO 100 PARTS BY MOLE OF Ti (PART BY MOLE) | CONTENT OF P WITH RESPECT TO 100 PARTS BY MOLE OF Si (PART BY MOLE) | SHRINKAGE RATIO (%) | DIELECTRIC CONSTANT | EVALUATION |
|---|---|---|---|---|---|---|
| 11* | 0.000 | 0.5 | 0 | 16.4 | 2474 | NO GOOD |
| 12 | 0.001 | 0.5 | 0.20 | 18.4 | 3174 | GOOD |
| 13 | 0.005 | 0.5 | 1.0 | 18.7 | 3521 | EXCELLENT |
| 14 | 0.01 | 0.5 | 2.0 | 18.5 | 3510 | EXCELLENT |
| 15 | 0.05 | 0.5 | 10 | 18.5 | 3484 | EXCELLENT |
| 16 | 0.1 | 0.5 | 20 | 18.6 | 3187 | GOOD |
| 17 | 0.2 | 0.5 | 40 | 18.4 | 3069 | GOOD |
| 18 | 0.5 | 0.5 | 100 | 18.4 | 3027 | GOOD |
| 19* | 0.000 | 1.0 | 0 | 16.6 | 2492 | NO GOOD |
| 20 | 0.001 | 1.0 | 0.10 | 18.4 | 2985 | GOOD |
| 21 | 0.005 | 1.0 | 0.50 | 18.5 | 3022 | GOOD |
| 22 | 0.01 | 1.0 | 1.0 | 18.7 | 3308 | EXCELLENT |
| 23 | 0.05 | 1.0 | 5.0 | 18.9 | 3393 | EXCELLENT |
| 24 | 0.1 | 1.0 | 10 | 18.9 | 3293 | EXCELLENT |
| 95 | 0.2 | 1.0 | 20 | 18.4 | 3039 | GOOD |
| 26 | 0.5 | 1.0 | 50 | 18.2 | 2978 | GOOD |
| 27* | 0.000 | 2.0 | 0 | 16.8 | 2557 | NO GOOD |
| 28 | 0.001 | 9.0 | 0.05 | 18.3 | 2727 | GOOD |
| 29 | 0.005 | 2.0 | 0.25 | 18.5 | 2804 | GOOD |
| 30 | 0.01 | 2.0 | 0.5 | 18.2 | 2816 | GOOD |
| 31 | 0.02 | 2.0 | 1.0 | 18.8 | 3121 | EXCELLENT |
| 32 | 0.05 | 2.0 | 2.5 | 18.8 | 3162 | EXCELLENT |
| 33 | 0.1 | 2.0 | 5.0 | 18.7 | 3148 | EXCELLENT |
| 34 | 0.2 | 2.0 | 10 | 18.5 | 3036 | EXCELLENT |
| 35 | 0.5 | 9.0 | 25 | 18.6 | 2850 | GOOD |

The samples of sample numbers 11 to 18 in Table 2 each are a sample that contains 0.5 part by mole of Si with respect to 100 parts by mole of Ti and contains 0 to 0.5 part by mole of P with respect to 100 parts by mole of Ti. The samples of sample numbers 19 to 26 each are a sample that contains 1.0 part by mole of Si with respect to 100 parts by mole of Ti and contains 0 part by mole to 0.5 part by mole of P with respect to 100 parts by mole of Ti. The samples of sample numbers 27 to 35 each are a sample that contains 2.0 parts by mole of Si with respect to 100 parts by mole of Ti and contains 0 part by mole to 0.5 part by mole of P with respect to 100 parts by mole of Ti.

In Table 2, the samples of sample numbers 12 to 18, 20 to 26, and 28 to 35 each not having a suffix "*" satisfy the above-mentioned requirements for the present invention. On the other hand, the samples of sample numbers 11, 19, and 27 each having a suffix "*" do not satisfy the above-mentioned requirements for the present invention.

Table 2 shows the dielectric constants obtained at different contents of P on conditions that the contents of Si are 0.5 part by mole, 1.0 part by mole and 2.0 parts by mole with respect to 100 parts by mole of Ti. These dielectric constants were evaluated on three scales including "excellent", "good", and "no good". Specifically, a maximum value Ed of the dielectric constants obtained in different contents of P and a fixed content of Si was calculated. Then, based on the relation between maximum value Ed and a dielectric constant ε, dielectric constant ε was evaluated as follows.

"Excellent": $\varepsilon_d \times 0.95 < \varepsilon$

"Good": $\varepsilon_d \times 0.85 \leq \varepsilon \leq \varepsilon_d \times 0.95$ "No Good": $\varepsilon < \varepsilon_d \times 0.85$ Furthermore, Table 3 shows the content of P with respect to 100 parts by mole of Ti, the content of Si with respect to 100 parts by mole of Ti, and the evaluation result about the dielectric constant, which are summarized based on the results shown in Table 2.

TABLE 3

| | | CONTENT OF Si WITH RESPECT TO 100 PARTS BY MOLE OF Ti (PART BY MOLE) | | |
|---|---|---|---|---|
| | | 0.5 | 1.0 | 2.0 |
| CONTENT OF P WITH RESPECT TO 100 PARTS BY MOLE OF Ti (PART BY MOLE) | 0.001 | GOOD | GOOD | GOOD |
| | 0.005 | EXCELLENT | GOOD | GOOD |
| | 0.01 | EXCELLENT | EXCELLENT | GOOD |
| | 0.02 | | | EXCELLENT |
| | 0.05 | EXCELLENT | EXCELLENT | EXCELLENT |
| | 0.1 | GOOD | EXCELLENT | EXCELLENT |
| | 0.2 | GOOD | GOOD | EXCELLENT |
| | 0.5 | GOOD | GOOD | GOOD |

As shown in Table 2, the dielectric constants of the samples of sample numbers 11, 19, and 27 not satisfying the requirements for the present invention were evaluated as "no good". This is presumed as a situation that these samples were not sufficiently densified during low-temperature firing, thereby leading to a relatively low dielectric constant.

In contrast, the samples of sample numbers 12 to 18, 20 to 26, and 28 to 35 satisfying the requirements for the present invention are higher in dielectric constant than the samples not satisfying the requirements for the present invention, so that low-temperature sintering can be implemented.

In particular, as to the samples of sample numbers 13 to 15, 22 to 24, and 31 to 34 that each contain P of: 0.005 part by mole to 0.20 part by mole with respect to 100 parts by mole of Ti; and 1 part by mole to 10 parts by mole with respect to 100 parts by mole of Si, the dielectric constants of these samples are evaluated as "excellent". In each case, the dielectric constant is particularly high and the low-temperature sinterability is relatively higher.

EXAMPLE 3

A plurality of types multilayer ceramic capacitors including dielectric layers containing P at different positions each were produced and examined to obtain the dielectric constant, the high temperature reliability, and the moisture proof reliability.

First, a ceramic material was produced by the same method as that in Example 1. However, when the ceramic material was produced, prepared powder of each of $SiO_2$, $MnCO_3$, $MgCO_3$, $Dy_2O_3$, and $ZrO_2$ was weighed to respectively contain: 1.5 parts by mole of Si; 0.25 part by mole of Mn; 1.0 part by mole of Mg; 1.0 part by mole of Dy; and 0.10 part by mole of Zr with respect to 100 parts by mole of Ti, and then, added to main component powder, to thereby obtain a powder mixture. Then, using a ball mill, the obtained powder mixture was wet-blended with dibutyl phosphate weighed to contain 0.05 part by mole of P with respect to 100 parts by mole of Ti.

Then, a multilayer ceramic capacitor was produced by the same method as that in Example 1. It should be noted that the firing temperature was set at 1180° C.

Also, a ceramic green sheet having P added thereto and a ceramic green sheet having P not added thereto were prepared to produce a plurality of types of multilayer ceramic capacitors each containing P at optional positions in an outer dielectric layer, an inner dielectric layer and a side margin portion.

The multilayer ceramic capacitor in which the inner dielectric layer and the side margin portion contain different amounts of P can be produced as follows. Specifically, for example, a mother multilayer body is produced by the same method as that in Example 1, from which a portion corresponding to a side margin portion is cut out and removed. Then, a ceramic green sheet different from that of the inner dielectric layer is affixed to the cutout portion of the mother multilayer body and then fired to thereby produce the above-mentioned multilayer ceramic capacitor.

<Evaluation of Characteristics>

The dielectric constant, the high temperature reliability, and the moisture proof reliability of the produced multilayer ceramic capacitor were examined. The dielectric constant was measured by the same method as that in Example 1.

The high temperature reliability was examined by the following method. Specifically, eighteen multilayer ceramic capacitors were prepared, to which a direct-current (DC) voltage of 6.3V was applied in an environment of 85° C. Then, while observing the temporal deterioration of the insulation resistance, it was determined that a failure occurred at the time when the insulation resistance reached 0.1 MΩ or less. The initial value of the insulation resistance is 10 MΩ or more. Such a high temperature load test was conducted for 2000 hours. Then, the number of failures occurring in these eighteen multilayer ceramic capacitors was checked.

The moisture proof reliability was examined by the following method. Specifically, seventy multilayer ceramic capacitors were prepared, to which a DC voltage of 6.3V was applied in an environment of 85° C. and 85% RH. Then, while observing the temporal deterioration of the insulation resistance, it was determined that a failure occurred at the time when the insulation resistance reached 0.1 MΩ or less. The initial value of the insulation resistance is 10 MΩ or more. Such a moisture proof load test was conducted for 2000 hours. Then, the number of failures occurring in these seventy multilayer ceramic capacitors was checked.

Table 4 shows the results of measurement of the dielectric constant, the high temperature reliability, and the moisture proof reliability for a plurality of types of multilayer ceramic capacitors containing P at different positions.

TABLE 4

| | P CONTAINING POSITION | | | | | |
|---|---|---|---|---|---|---|
| SAMPLE NUMBER | INNER DIELECTRIC LAYER | OUTER DIELECTRIC LAYER | SIDE MARGIN PORTION | DIELECTRIC CONSTANT | HIGH TEMPERATURE RELIABILITY | MOISTURE PROOF RELIABILITY |
| 41* | | | | 2529 | 0/18 | 13/70 |
| 42 | ○ | | | 3346 | 0/18 | 10/70 |

TABLE 4-continued

| SAMPLE NUMBER | P CONTAINING POSITION | | | DIELECTRIC CONSTANT | HIGH TEMPERATURE RELIABILITY | MOISTURE PROOF RELIABILITY |
| --- | --- | --- | --- | --- | --- | --- |
| | INNER DIELECTRIC LAYER | OUTER DIELECTRIC LAYER | SIDE MARGIN PORTION | | | |
| 43 | | ○ | | 2650 | 0/18 | 6/70 |
| 44 | | | ○ | 2627 | 0/18 | 3/70 |
| 45 | | ○ | ○ | 2667 | 0/18 | 0/70 |
| 46 | ○ | ○ | ○ | 3355 | 0/18 | 0/70 |

In Table 4, the samples of sample numbers 42 to 46 with no suffix "*" each satisfy the above-mentioned requirements for the present invention. On the other hand, the sample of sample number 41 with a suffix "*" does not satisfy the above-mentioned requirements for the present invention.

As shown in Table 4, the samples of sample numbers 42 to 46 where the dielectric layers each contain P and that satisfy the requirements for the present invention are higher in dielectric constant and less in number of failures occurring in the moisture proof load test than the sample of sample number 41 where the dielectric layer does not contain P and that does not satisfy the requirements for the present invention.

Furthermore, the sample of sample number 43 where only the outer dielectric layer contains P and the sample of sample number 44 where only the side margin portion contains P are less in number of failures occurring in the moisture proof load test than the sample of sample number 42 where only the inner dielectric layer contains P. This is due to the following reason. Specifically, as compared with the inner dielectric layer, the outer dielectric layer and the side margin portion are less likely to be densified during firing. Accordingly, addition of P to the outer dielectric layer or the side margin portion can improve densification during firing, thereby allowing low-temperature sintering and firing in a short time period, so that the moisture proof reliability is improved.

For the reason as described above, the sample of sample number 45 where the outer dielectric layer and the side margin portion each contain P was further improved in moisture proof reliability, thereby leading to no (zero) failure occurring in the moisture proof load test. Accordingly, as seen in the plane defined in stacking direction T and width direction W at the central position in length direction L, the configuration where P is contained in each of the outer dielectric layer and the side margin portion and where P and Si segregate in at least one of the grain-boundary triple points is more preferable than the configuration where P is contained in one of the inner dielectric layer, the outer dielectric layer and the side margin portion and where P and Si segregate in at least one of the grain-boundary triple points.

Furthermore, in the sample of sample number 46 where the inner dielectric layer, the outer dielectric layer, and the side margin portion each contain P, no (zero) failure occurred in the moisture proof load test, and the highest dielectric constant was achieved. Thus, it is more preferable that, as seen in the plane defined in stacking direction T and width direction W at the central position in length direction L, P is contained in each of the inner dielectric layer, the outer dielectric layer, and the side margin portion, and also, P and Si segregate in at least one of the grain-boundary triple points at their respective central positions in the inner dielectric layer, the outer dielectric layer, and the side margin portion.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A multilayer ceramic capacitor comprising:
    a ceramic body including a stack of a plurality of dielectric layers and a plurality of first and second internal electrodes, the ceramic body having
        a first main surface and a second main surface that face each other in a stacking direction,
        a first side surface and a second side surface that face each other in a width direction orthogonal to the stacking direction, and
        a first end face and a second end face that face each other in a length direction orthogonal to the stacking direction and the width direction;
    a first external electrode electrically connected to each of the first internal electrodes at the first end face of the ceramic body; and
    a second external electrode electrically connected to each of the second internal electrodes at the second end face of the ceramic body, wherein
    each of the plurality of dielectric layers containing Ba, Ti, P and Si, and the plurality of dielectric layers include
        an outer dielectric layer located on an outermost side of the ceramic body in the stacking direction,
        an inner dielectric layer located between the first and second internal electrodes adjacent to each other in the stacking direction, and
        a side margin portion in a region where the first and second internal electrodes do not exist when the ceramic body is viewed in the stacking direction, and
    in at least one of the outer dielectric layer, the inner dielectric layer and the side margin portion, the P and the Si segregate in at least one of grain-boundary triple points of three ceramic particles of the ceramic particles as seen in a plane defined in the stacking direction and the width direction at a central position in the length direction, and
    wherein a content of the P is 0.005 part by mole to 0.20 part by mole with respect to 100 parts by mole of Ti.

2. The multilayer ceramic capacitor according to claim 1, wherein each of the plurality of dielectric layers further includes R, the R is at least one type selected from La, Ce, Pr, Nd, Sm, Eu, Gd, Tb, Dy, Ho, Er, Tm, Yb, Lu, and Y, and a content of the R is 0.3 part by mole to 5.0 parts by mole with respect to 100 parts by mole of Ti.

3. The multilayer ceramic capacitor according to claim 2, wherein a content of the R is equal to or greater than 0.5 part by mole and equal to or less than 2.5 parts by mole with respect to 100 parts by mole of Ti.

4. The multilayer ceramic capacitor according to claim 2, wherein each of the plurality of dielectric layers further includes M, the M is at least one type selected from Mg, Zr, Mn, Co, Fe, Cr, Cu, Al, V, Mo, and W, and a content of the M is 0.3 part by mole to 4.0 parts by mole with respect to 100 parts by mole of Ti.

5. The multilayer ceramic capacitor according to claim 4, wherein the content of the M is 0.5 part by mole to 2.0 parts by mole with respect to 100 parts by mole of Ti.

6. The multilayer ceramic capacitor according to claim 1, wherein each of the plurality of dielectric layers further includes M, the M is at least one type selected from Mg, Zr, Mn, Co, Fe, Cr, Cu, Al, V, Mo, and W, and a content of the M is 0.3 part by mole to 4.0 parts by mole with respect to 100 parts by mole of Ti.

7. The multilayer ceramic capacitor according to claim 6, wherein the content of the M is 0.5 part by mole to 2.0 parts by mole with respect to 100 parts by mole of Ti.

8. The multilayer ceramic capacitor according to claim 1, wherein, in each of the outer dielectric layer, the inner dielectric layer and the side margin portion of the plurality of dielectric layers, the P and the Si segregate in at least one of the grain-boundary triple points.

9. The multilayer ceramic capacitor according to claim 1, wherein a source of the P is phosphate ester.

10. The multilayer ceramic capacitor according to claim 4, wherein each of the plurality of dielectric layers include ceramic particles having a core portion made of a perovskite-type compound containing the Ba and the Ti; and a shell portion containing the R and the M around the core portion.

11. The multilayer ceramic capacitor according to claim 10, wherein the core portion is made of barium titanate not containing at least Ca; and the shell portion contains Ca, Mg, the R and the M around the core portion.

12. The multilayer ceramic capacitor according to claim 10, wherein the core portion is $Ba_mTiO_3$ not containing Ca, the R, the M, and the Si, and $0.99 \leq m \leq 1.02$.

* * * * *